United States Patent [19]
Gettys et al.

[11] Patent Number: 4,882,301
[45] Date of Patent: Nov. 21, 1989

[54] DECORATIVE AND PROTECTIVE BORDERS FOR AUTOMOBILE SIDE AND REAR LIGHTS

[75] Inventors: James R. Gettys, Mars, Pa.; Gordon H. Johnson, Olmsted Falls, Ohio; Temel Demiray, Hinckley, Ohio; William D. Faust, Aurora, Ohio

[73] Assignee: Ferro Corporation, Cleveland, Ohio

[21] Appl. No.: 157,069

[22] Filed: Feb. 2, 1988

Related U.S. Application Data

[63] Continuation of Ser. No. 785,809, Oct. 9, 1985, abandoned.

[51] Int. Cl.$^4$ .......................... C03C 8/14; C03C 8/16; C03C 14/00
[52] U.S. Cl. .......................... 501/17; 501/14; 501/20; 501/21; 501/26; 501/32
[58] Field of Search .................. 501/14, 17, 20, 26, 501/32, 21

[56] References Cited

U.S. PATENT DOCUMENTS

| | | | |
|---|---|---|---|
| 577,383 | 6/1959 | Short | 501/21 |
| 2,920,971 | 1/1960 | Stookey | 501/5 |
| 4,196,004 | 4/1980 | Berretz | 501/26 |
| 4,224,627 | 9/1980 | Powell et al. | 346/75 |
| 4,310,357 | 1/1982 | Matsuura et al. | 501/22 |
| 4,365,021 | 12/1982 | Pirooz | 501/15 |
| 4,522,925 | 6/1985 | Pirooz | 501/17 |

FOREIGN PATENT DOCUMENTS

| | | | |
|---|---|---|---|
| 41-12220 | 7/1966 | Japan | 501/26 |
| 54-20018 | 2/1979 | Japan | 501/26 |

*Primary Examiner*—Mark L. Bell
*Attorney, Agent, or Firm*—Walter C. Danison

[57] ABSTRACT

There is provided a glass enamel system adaptable to be fired from about 1000° F. to about 1350° F., said glass enamel characterized, upon firing, by a formation therein of metal orthosilicate crystals, which has the effect of substantially hardening the surface of said glass enamel even at its fusion point temperature, and within the range aforesaid.

6 Claims, 1 Drawing Sheet

DECORATIVE AND PROTECTIVE BORDERS FOR AUTOMOBILE SIDE AND REAR LIGHTS

This is a continuation of copending application Ser. No. 785,809, filed on Oct. 9, 1985, now abandoned.

BACKGROUND AND FIELD OF THE INVENTION

Modern automobile side and rear lights, or windows, are being produced more and more with varying degrees of curvature, as opposed to flat, planular panes.

Normally, such window pieces are manufactured or blanked, and tempered, following essentially the same procedures employed for the production of plate glass. If a curvature is desired in a given blank, it is simply heated to a temperature in the vicinity of 688° C., at which point it is ready to be subjected to bending or curving stress employing any number of suitable molding or pressing techniques, which actually take place slightly lower than furnace ambient, in the vicinity of 677° C., for example. The glass, during the bending operation, still has sufficient surface hardness such that the molding or bending member does not disturb the glass surface with which it comes into contact.

One of the preferred methods for bending and tempering automotive side and rear lights (hereinafter sometimes referred to as "quarterlites") is that described in some detail in U.S. Pat. No. 4,282,026, "APPARATUS FOR BENDING AND TEMPERING GLASS" incorporated herein by reference.

The phase of the patented process, which is of special significance in connection with the instant invention, is that step wherein the preheated quarterlite is vacuum lifted from the roller hearth or conveyor of the initial heating furnace, and transferred to the mold for bending or shaping under the force of gravity, while still hot.

Transfer from the furnace hearth rollers to the bending mold is accomplished by a head which lifts the hot glass for transfer under a vacuum. The vacuum head is faced with a somewhat resilient pad fashioned of ceramic fiber, one type known as "Fiberfrax", manufactured by the Carborundum Company. The relatively soft, and very slightly resilient, padding functions as a cushion to minimize any tendency to disturb the polished surface of the hot quarterlite during transfer to the bending mold.

As is well known, quarterlites are secured in their openings, upon installation, by an adhesive between the glass and an inner flange of the opening, the glass being pushed into adhering contact from the outside. Following fixing of the glass in the foregoing manner, a suitable, decorative (usually metallic) frame is put into place from the outside, to cover and seal the glass edge, and to also function as an exterior decorative frame for the glass.

Of late, automotive manufacturers have found that the appearance of the quarterlite is greatly enhanced, and the underlying layer of adhesive is both masked and protected from UV degradation, by applying a relatively narrow, opaque, colored band or border around the edge of the glass, on the inner surface; this band frames the edge of the inner surface, and may vary anywhere from an inch to six inches wide.

Preferably, the combination decorative and protective colored layer which completely frames the inner surface of the glass, is sufficiently opaque to mask and protect the adhesive from UV degradation. It is also preferably of a relatively dark color, black or dark gray, so as to be compatible with the myriad colored finishes currently applied to the automotive exterior. That is, a narrow portion of the band may be viewed from outside the car if it extends past the decorative molding.

Because of its relative durability, it has been found that the colored band is best applied in the form of a vitreous, glass enamel around the edge of the inner surface of a quarterlite, followed by firing to fusion, as is well known in the glass enamelling art.

However, the need for the added manufacturing steps of screening the glass color onto the window pane to be decorated, drying, followed by a firing operation, cooling, etc., prior to bending or forming, proved to be prohibitively expensive.

The idea as then conceived that, if the glass pane were to receive the screened-on glass enamel band, prior to the bending operation, the glass enamel could then be fired as a consequence of preheating the glass pane at the approximately 688° C. temperature, preparatory to bending at or about 677° C.

However, this procedure had one, very serious, disadvantage. When the Fiberfrax faced vacuum head came into contact with the still-soft, enameled surface of the vitreous, decorative band, two undesirable events occurred. First, the Fiberfrax-covered face of the transfer head left a faint, patterned imprint in the soft glass enamel, to which a few random fibers tended to stick, while at the same time, a sufficient amount of the somewhat tacky glass enamel was abraded, and/or absorbed onto or into the Fiberfrax material which, probably because of the fluxing action of the enamel glass, tended to erode the Fiberfrax face, thereby requiring frequent, and expensive replacement. During replacement, the bending member obviously was out of service, necessitating a shutdown of the bending line, etc.

One solution was to increase the refractory nature of the glass enamel by conventional means, whereby its fusion temperature was sufficiently high so that it did not adhere to the Fiberfrax facing. But then it could not be fired out and matured as a consequence of, and simultaneously with, the preheating operation.

It has been discovered by the instant inventors however, that by employing the highly specialized glass enamel formulation of this invention, a glass enamel can be produced which will provide the required fired and matured glass color band or border around the edge of the auto window pane, at or about bending temperatures, but which at the same time will be totally resistant to abrasion by, or adherence to, the Fiberfrax pad of the vacuum head of the transfer member discussed above.

Simply stated, the glass enamel of this invention has been formulated in such a way that it fuses to maturity at the temperature at which the quarterlite is preheated preparatory to the bending operation. But then, as a consequence of that preheating, it is theorized that the cured glass enamel immediately undergoes a partial devitrification, or recrystallization phenomenon, whereby, at its softening temperature, its surface remains sufficiently hard, such that there is no adhesion between the soft enamel and the Fiberfrax.

Thus, by the time the preheated, preenameled glass pane reaches the bending stage, and comes into contact with the Fiberfrax pad which covers the vacuum head, the glass enamel, though fused and "cured", is, and remains, sufficiently hard such that it completely resists yielding, to any noticeable degree, to the stress of the Fiberfrax-faced transfer member, and as a consequence, none of the glass enamel is abraded onto, or absorbed into, the Fiberfrax mesh to cause the damage described above. Furthermore, the Fiberfrax leaves no imprint in the fired glass enamel surface.

OBJECTS

It is therefore an object of this invention to provide a new and improved crystallizing glass enamel, which initially cures and fuses at one temperature, then, while maintained at or slightly below that temperature, crystallizes sufficiently to render its surface relatively hard and abrasion resistant, while still at or slightly below its initial fusion temperature.

It is another object of this invention to provide a glass enamel for decorating quarterlite surfaces, whereby said glass enamel fuses as a consequence of the temperatures achieved just prior to, and/or during, the bending operation of said quarterlites, but then hardness sufficiently at or about the same temperature so that it is essentially abrasion resistant during and just preceding said bending operation.

It is another object of this invention to provide a method for decorating quarterlites with glass enamel, whereby said enamel is caused to soften and fuse at or slightly above bending temperatures, converting to a more crystalline form, whereby it becomes less tacky or soft at said temperatures.

SUMMARY OF THE INVENTION

At this point it would be appropriate to define, so as to refresh the memory of those skilled in the art, a few of the terms used herein. A "glass enamel", is usually in the form of a paste, or viscous liquid adaptable to be silk screened onto a substrate, preferably glass, in any predetermined pattern. Ordinarily, the glass enamel will consist of basic, major constituents of which a glass frit matrix is the predominant component. A pigment, normally inorganic, is usually present in varying amounts, up to 20 weight percent, and the third essential constituent will be an organic vehicle, such as pin oil.

In practice, as will be hereinafter set forth in more detail, a glass frit, fusible at the relatively low glass enamel decorating temperatures, is ball-milled, along with a pigment, and a milling medium such as an alcohol/water dispersion, to extremely fine particle size. The foregoing milling is then dried and micronized in a suitable vehicle, such as pin oil, to produce a screenable paste.

The "paste" is generally referred to as a glass enamel, but for the purposes of this description, shall be termed a "glass enamel system".

In practice the paste is normally silk screened onto a glass substrate, dried, and then fired at temperatures ranging anywhere from 1000° to 1350° F. At these temperatures, any pin oil or other organic vehicle residue is fugitive, being burned off completely, the glass frit matrix fuses to the familiar smooth, glossy coating such as we find on certain soft drink bottles; the fired, glassy decoration taking on the color of whatever opacifiers or pigments were incorporated into the initial milling.

The fired, glossy decorative coating is also referred to as a "glass enamel", or, more properly, as a "fired, glass enamel." The latter term shall apply in this description.

The present invention comprises a glass enamel system, and a frit for incorporation into said system, for accomplishing the objective set forth above.

These may be accomplished in any one of several ways, but they all have in common one characteristic: they all produce, in the final, fired glass enamel, a quantity of cadmium orthosilicate, or zinc orthosilicate, crystals, or a mixture of the two. The crystals are generated, upon firing of the enamel, in sufficient quantity, as will be hereinafter defined, such that, following firing to fusion, the crystallization of the silicates of this invention, in the fired enamel, serve to harden the surface of said enamel, while at or above its fusion point, to resist sticking to the vacuum head. As will be shown by the working examples which follow, a cadmium borosilicate frit may be produced in accordance with this invention, which frit may then form the sole frit component of a glass enamel system as described above, to provide the benefits of this invention. The cadmium borosilicate frit may also be blended with a conventional glass enamel frit in the mill addition, as described above and demonstrated below, to realize the benefits of this invention in the finished, fired enamel.

The cadmium borosilicate frit has the general composition:

| OXIDE | Wt. % |
| --- | --- |
| CdO | 73 to 88 |
| $B_2O_3$ | 3 to 17 |
| $SiO_2$ | 3 to 21 | the foregoing components totalling 100 percent as they vary within their respective ranges.

Preferably the cadmium borosilicate frit has the general composition:

| OXIDE | Wt. % |
| --- | --- |
| CdO | 75 to 85 |
| $B_2O_3$ | 5 to 15 |
| $SiO_2$ | 5 to 15. |

It has also been found that pure, crystalline, non-vitreous cadmium orthosilicate may be employed in the mill addition described above, along with a conventional glass enamel host frit, pigment, etc., to produce a crystallizing glass enamel in accordance with the instant invention.

That is, the cadmium or zinc silicates of the instant invention are sufficiently versatile, such that they may be physically blended in the mill, as a separate crystalline component, with one or more conventional glass enamel frits to provide, on firing, fused glass enamels containing a crystallized amount of the cadmium or zinc silicates of this invention, all displaying the desirable fusion or softening temperature hardness.

Regardless, the ultimate goal of the present invention is to achieve a glass enamel system, adaptable to be fired onto auto quarterlites as a consequence of preheating and/or bending temperatures, which glass enamel composition thereupon forms crystallized cadmium silicate from contained precursors thereof, with the result that it becomes considerably less tacky, or sticky, if maintained at or above its initial softening, or curing temperature, than conventional glass enamels.

Although it was not feasible to do all the necessary testing of the instant invention on expensive quarterlites in a commercial production line, as will be disclosed hereinafter, a suitable laboratory technique was developed whereby the effective amount of crystal phase could be evaluated in the glass enamels of the instant invention, to thereby predict whether they would be abraded or absorbed by the Fiberfrax protective pad on the production vacuum head.

In the drawings,

FIG. 1 is the operative area of a triaxial diagram demonstrating the preferred ratios of $CdO:SiO_2:B_2O_3$ of the cadmium borosilicate frit of this invention, while FIG. 2 is a triaxial diagram depicting the preferred enamel system composition using pure cadmium silicate as a component thereof.

DESCRIPTION OF THE PREFERRED EMBODIMENTS

EXAMPLE 1

Figure 1:
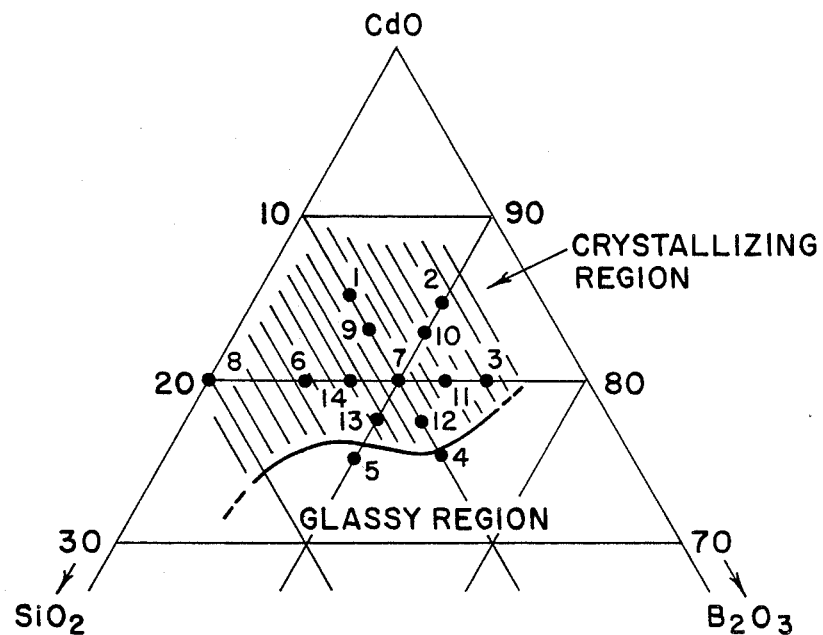

The following finely divided, glass raw batch materials were weighed as shown and thoroughly mixed. They were then smelted at 1200° C. to a molten, seed-free glass, quenched to the fritted state and dried, following conventional procedures.

| Component | Wt. % |
| --- | --- |
| Powdered Quartz | 9.38 |
| Hydrous Boric Acid | 18.33 |
| Cadmium Oxide | 72.29 |
| | 100.00 |

The analysis of the glass frit resulting from the foregoing batch would be essentially as follows:

| OXIDE | WT. % |
| --- | --- |
| CdO | 78.6 |
| $B_2O_3$ | 11.2 |
| $SiO_2$ | 10.2 |
| | 100.0 |

The foregoing glass, using conventional techniques, was then milled with the components indicated below, expressed in parts by weight, to provide two glass enamel systems or pastes adaptable to be applied to a glass surface, dried and fired to fusion, or maturity:

| Wt. % | | Wt. % | |
| --- | --- | --- | --- |
| 77.5 | frit | 72.5 | frit |
| 17.5 | coloring oxide | 17.5 | coloring oxide |
| 5.0 | Cordierite | 10.0 | Eucryptite |
| 40.0 | water/synasol | 40.0 | water/synasol |

"Synasol" is a trademark for a well-known proprietary solvent manufactured by Union Carbide, and is essentially a denatured ethanol containing one part per hundred of methyl isobutylketone, one part per hundred of ethylacetate, and one part per hundred of aviation gasoline. It may be blended with water in equal parts, or varied in accordance with the needs of any particular situation. In the foregoing example, the water:synasol ratio was 4:1. The above mixture was milled for 16 hours to achieve an average particle size of 2 microns, screened through a 200 mesh screen, dried, and then screened through a 94 mesh screen to break up any agglomerates.

A high intensity mixer was then used to make pastes for screen printing from the above compositions by mixing 6 grams of each composition with approximately 1.7 grams of a conventional pine oil cold screening medium. The foregoing glass enamels were screened onto a small sample glass test plate, dried and fired in the vicinity of 650° to 680° C.

To digress momentarily, on the subject of screening oils, pine oil is the traditional screening medium, usually requiring drying in the vicinity of 100° C. prior to firing and fusing of the glass enamel. For certain, high speed applications, as in the decorating of glass containers, the vehicle may be composed of a thermoplastic resin, screened hot with practically instantaneous hardening when it is applied to a relatively cool container. Obviously no drying is necessary and the decorated container may go directly into a furnace for firing the glass enamel. There are also UV curable screening mediums, which are hardened simply by passing the decorated piece of glass through a battery of UV lamps to cure and harden the organic screening medium, prior to firing to fusion.

Obviously, any of the foregoing conventional media may be employed in the practice of the instant invention.

At any rate, the two glass enamel systems described above matured to vitreous, black mat surfaces, and while maintained at their initial fusion temperatures, finely divided alumina powder (average particle size approximately 41 microns) was lightly dusted onto the surface of the glass enamel; the enameled test plate was then cooled to room temperature.

With a soft brush, essentially all of the alumina powder (90%) was readily dusted away from the surface of the fused glass enamel, thereby indicating that, although the glass enamel readily fused at the above temperatures, it also underwent a devitrification or crystallization phenomenon, which rendered its surface literally "hard to the touch" at initial fusion points or softening temperatures. The powdered alumina test thereby indicating, as borne out by later production testing and comparison on automobile quarterlites, that they could be readily bent or formed at the temperature at which the foregoing enamel fused, but at the same time, the enamel was also sufficiently hard that it did not partially lift off the glass substrate, and transfer to the Fiberfrax pad.

Although it is only theory, and the inventors hereof do not wish to be bound thereby, it is possible that a certain amount of cadmium or zinc orthosilicate quickly crystallizes out of glass solution at firing temperatures, thereby forming a dense, hard, protective phase which somehow restricts physical penetration into the glass phase. This would account for the lack of adherence of the glass enamel to the Fiberfrax pad at, below, or slightly above initial fusion temperatures.

As will be established hereinafter by the following examples, it is believed that invention resides in a glass enamel system that contains a "crystallizing amount" of the precursors of cadmium or zinc orthosilicate ($Cd_2SiO_4, Zn_2SiO_4$), and/or possibly some cadmium or zinc metasilicate ($CdSiO_3, ZnSiO_3$). These precursors are present in the system either as smelted-in components of one or more of the frits present, or as crystalline silicates physically dispersed with the host or frits in the mill addition of the enamel system.

By a "crystallizing amount" of cadmium orthosilicate precursors ($CdO_2$ and $SiO_2$) for example, is meant an amount sufficient to produce crystallized cadmium silicate upon firing the glass enamel to fusion and maturity, regardless of the composition of the host glass matrix, in a sufficient quantity of said crystals to harden the melt, as determined by a dusting thereon of alumina powder, at, below or slightly above its initial fusion temperature, which powder fails to adhere or stick thereto; at least 90% of said powder so dusted on the fired glass enamel being readily and easily brushed away when the enamel is cooled to room temperature.

As stated above, when at least 90% of alumina powder dusted on the glass enamel as described above can be dusted away at room temperature, no problem will likely be encountered by the lifting of the glass enamel, at glass bending or forming temperatures, to thereby damage the Fiberfrax vacuum pad or the surface of the fired enamel.

Stated yet another way, a "crystallizing amount" of cadmium orthosilicate precursors in either the cadmium borosilicate glass frit hereof, or an unfired glass enamel system hereof, is meant an amount sufficient to produce sufficient crystals of cadmium or zinc orthosilicate in the fired enamel such that it does not stick to the Fiberfrax pad during the transfer operation at or about glass bending or forming temperatures, and such that the pad leaves the surface of the fired glass enamel undisturbed. For the purpose of this disclosure, the metal silicate added directly to the mill is considered a precursor of itself.

Referring again now to FIG. 1; the cross-hatched area therein covers generally the workable, crystallizing region of the cadmium borosilicate glass frit useful in the practise of this invention.

Set forth below in Table 1, and numbered to correspond to the numbered points on the FIG. 1 triaxial, are the precise weight percent compositions of the thirteen glasses depicted therein. It is to be noted however, that point No. 8 is pure cadmium silicate, which is not a glass, and when an attempt was made to smelt it, along with the other glass compositions, it simply did not fuse to a glass. However, composition No. 8 is still extremely useful in the practice of this invention, but using a slightly different technique, as will be developed in more detail hereinafter.

At any rate, all the glass compositions of Table 1, and as they are illustrated in FIG. 1, can function either alone, or when blended with another glass frit in varying proportions, to accomplish the objective of this invention, namely, a crystalline fired glass enamel as a consequence of same having contained a recrystallizing amount of CdO and $SiO_2$ as precursors of cadmium silicate in the unfired system.

develop too low a coefficient of thermal expansion, thereby rendering them unsuitable as glass enamels for quarterlites.

It should be noted that, when the cadmium borosilicate glass of this invention is not utilized alone, but in combination with another, host glass, or when relatively pure cadmium silicate is dispersed with a host glass matrix to achieve an enamel system with a crystallizing amount of the precursors of cadmium silicate, (such as cadmium silicate itself), the composition of the host glass is not at all critical, and may be any number of glass enamel compositions well known in the art.

Requiring only very minor experimentation, any glass composition, functional as a conventional glass enamel within the temperature ranges of quarterlite shaping, may be adapted for use in the practice of this invention.

Any conventional glass enamel frit will of course have a coefficient of thermal expansion compatible with that of auto quarterlites, and to the extent it may have to be adjusted downwardly, any number of refractory materials may be used in small amounts, in the mill addition, to slightly lower the expansion. Exemplary of such refractories would be Cordierite, or beta-Eucryptite.

Furthermore, with very little experimentation, utilizing the alumina powder test described herein, any conventional glass enamel frit may be tested, incorporating either crystalline cadmium silicate, or the cadmium borosilicate glass of this invention in varying amounts, to quickly determine the crystallizing amount of either required in a given system, to provide the final, fired glass enamel contemplated by this invention.

Because of the relatively small amount of the pigment incorporated into the composition, its presence is generally considered neutral, and most conventional, basic, glass enamels are formulated in such a way as to readily accommodate pigmenting amounts of inorganic color oxides, while retaining compatible fusion and fit characteristics.

EXAMPLE 2

To demonstrate the utility of the cadmium borosilicate frit of Example 1 when blended with a more conventional frit, in a glass enamel composition, the following experiment was conducted.

First, using conventional, powdered raw materials which were weighed and mixed in the appropriate pro-

TABLE 1

| | Weight Percent Compositions | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| CdO | 85 | 85 | 80 | 75 | 75 | 80 | 80 | 80 | 83 | 83 | 80 | 77 | 77 | 80 |
| $SiO_2$ | 10 | 5 | 5 | 10 | 15 | 15 | 10 | 20 | 10 | 7 | 7 | 10 | 13 | 13 |
| $B_2O_3$ | 5 | 10 | 15 | 15 | 10 | 5 | 10 | - | 7 | 10 | 13 | 13 | 10 | 7 |
| Total | 100 | 100 | 100 | 100 | 100 | 100 | 100 | 100 | 100 | 100 | 100 | 100 | 100 | 100 |

Referring back to FIG. 1, the curved line at the bottom of the crystallizing region indicate roughly the line below which, due to the increase in silica and/or $B_2O_3$, the excessive glassy phase generated thereby tends to hinder and retard sufficient crystallization of cadmium silicate, and such compositions would be generally unsuitable for the practice of this invention. Note that compositions 4 and 5, while workable, are borderline because of the high degree of vitrification.

On the other hand, compositions 7, 12 and 13 are ideal. Compositions containing greater CdO than Nos. 1 and 2 tend to become too refractory, and may tend to portions, as well known in the art, following smelting, fritting and drying, a fritted glass composition of the following analysis was produced.

| OXIDE | WT. % |
|---|---|
| PbO | 50.33 |
| $SiO_2$ | 34.40 |
| $B_2O_3$ | 7.98 |
| $TiO_2$ | 1.01 |
| CdO | 2.85 |

-continued

| OXIDE | WT. % |
|---|---|
| Al$_2$O$_3$ | 3.43 |
| | 100.00 |

The exact procedure of Example 1 was followed, except ¾ of the high cadmium frit of Example 1 was replaced by the high lead glass composition of this Example 2.

When applied to a glass test plate, and fired at about 688° C., the recrystallization phenomenon occurred, and the alumina test method described above established that there was a crystallizing amount of cadmium orthosilicate precursors in the enamel system prior to firing, to result in sufficient crystallized Cd$_2$SiO$_4$ in the fired enamel such that, under actual production conditions, there would be no transfer of the glass enamel to the Fiberfrax forming pad, or vice versa.

ZINC IS THE SUBSTANTIAL EQUIVALENT OF CADMIUM

At this juncture it should be noted again that, probably because of their proximity in the periodic table, zinc and cadmium ions are essentially interchangeable in the practise of this invention. That is, Zn$_2$SiO$_4$ functions essentially the same as cadmium orthosilicate, as described above, and Zn can be substituted directly for Cd either in the cadmium borosilicate glass, or in the sintered cadmium silicate.

Therefore, for the purposes of this invention, zinc and cadmium are generally equivalents, although cadmium seems to have a slight edge from the standpoint of having a somewhat longer range of devitrification, as it were, than zinc. Nevertheless, at the operating temperatures for bending or forming quarterlites, zinc orthosilicate will function substantially as well as the cadmium silicate.

In testing the glass enamels of this invention at temperatures well in excess of those used for bending quarterlites, although Zn$_2$SiO$_4$ crystallized predictably as did the cadmium silicate, when tested at a higher temperature of 1350° F. (733° C.), the alumina powder test predicted that the Fiberfrax pad would tend to stick to the glass which had crystallized zinc orthosilicate at this higher temperature, whereas the cadmium silicate crystals still serve to render the glass enamel non-adherent to the Fiberfrax pad at the elevated temperature, as inferred from the powdered alumina test.

Obviously, any ratio of the zinc or cadmium orthosilicate crystals, so long as they were formed in the fired glass enamel from a crystallizing amount of the precursors thereof, would function to provide the benefits of this invention, as would a mixed silicate crystal of these two metals, i.e., ZnCdSiO$_4$.

FORMATION OF SINTERED SILICATE

Crystalline cadmium orthosilicate for use as a mill addition along with a conventional, host glass enamel frit, was produced by sintering a stoichiometric amount of CdO and SiO$_2$, or at a mole ratio of 2:1, CdO to SiO$_2$.

Although, since the two oxides undergo something of a solid state reaction during sintering, they each should be in a finely divided state, this would be a matter of choice, and the actual particle size of the oxides used in reducing this aspect of the invention to practice were approximately 1 micron average for the CdO, and approximately 13 microns average for SiO$_2$; actually, the latter particle size probably range from about 0.8 microns to about 100 microns.

At any rate, the CdO and SiO$_2$ oxides were thoroughly dry mixed, then micronized to insure a homogeneous dispersement.

The mixture was then fired in an appropriate crucible for 3 hours at 1,050° C. to initiate and complete the solid state reaction following which the sinter cake was cooled and wet milled in either an aqueous or alcohol/water medium to a fineness of approximately 2 micron average particle size as measured by a Fisher subsieve analyzer.

Zn$_2$SiO$_4$ was produced following the same procedures, commencing with a mixture of 2 moles of ZnO to 1 mole of SiO$_2$, sintered at 1275° C. for 3 hours, following milling and drying as in the case of cadmium silicate described above.

CdZnSiO$_4$ was produced by sintering in much the same manner, i.e., a premixture of 1 mole each of CdO, ZnO and SiO$_2$, followed by micronizing and dry reacting at between 900° C. and 1100° C. for three hours, milling in water or a polyol to a fineness of 2 to 6 microns particles size, drying, etc.

So as to avoid disturbing the stoichiometric equilibrium between the various components of the sintered silicates described above, they are best sintered in a platinum crucible. Because of the reactive nature of the silicates of this invention, if they are sintered in conventional crucibles or kilns lined with certain refractories, the purity, indeed the basic structure of the silicates, could be adversely affected because of the presence of complexes resulting from a reaction of the silicates sought to be produced by sintering, with the components of the material forming the crucible container, or the refractory liner of the kiln or smelter.

EXAMPLE 3

To demonstrate the utility of the crystalline silicates of this invention as mill additions, in combination with a conventional glass enamel host frit, the following experiments were conducted.

Following the procedures outlined under Example 2 above, below is an oxide breakdown of a conventional glass enamel frit produced, similar to that detailed in Example 2, but with a slightly different balance of the major constituents of PbO, SiO$_2$ and B$_2$O$_3$. Note that CdO is also slightly elevated.

| OXIDE | WT. % |
|---|---|
| PbO | 65 |
| SiO$_2$ | 25 |
| B$_2$O$_3$ | 5 |
| Na$_2$O | 1 |
| CdO | 4 |

The foregoing frit was incorporated into a glass enamel system in accordance with the following Table II, utilizing a conventional pine oil vehicle.

TABLE II

| | Weight Percent Compositions | | | | |
|---|---|---|---|---|---|
| | 1 | 2 | 3 | 4 | 5 |
| Frit | 47.5 | 42.5 | 37.5 | 45 | 40 |
| Pigment | 17.5 | 17.5 | 17.5 | 15 | 20 |
| Cadmium Silicate | 35 | 40 | 45 | 40 | 40 |
| Total | 100 | 100 | 100 | 100 | 100 |

The foregoing systems were screened onto test plates, fired at or about bending temperatures, and the powdered alumina test predicted that all five systems were excellent from the standpoint of having had contained therein a crystallizing amount of Cdo and $SiO_2$ as precursors of $Cd_2SiO_4$, whereby the fired enamels, at, about, or above their initial fusion temperatures, would not adhere to the Fiberfrax pad, or vice versa. The five compositions set forth above are plotted on the triaxial of FIG. 2.

An X-ray diffraction examination of the metal silicate sinters revealed that the major constituent was the orthosilicate, with the metasilicate being the secondary or minor constituent, with only a trace of $Cd_3SiO_5$ or $Zn_3SiO_5$ present. In like manner, X-ray diffraction examination of the fired glass enamels of this invention indicated that the predominant crystalline structure present was the metal orthosilicate, $M_2SiO_4$, wherein M may be Cd, Zn, or both.

Figure 2:
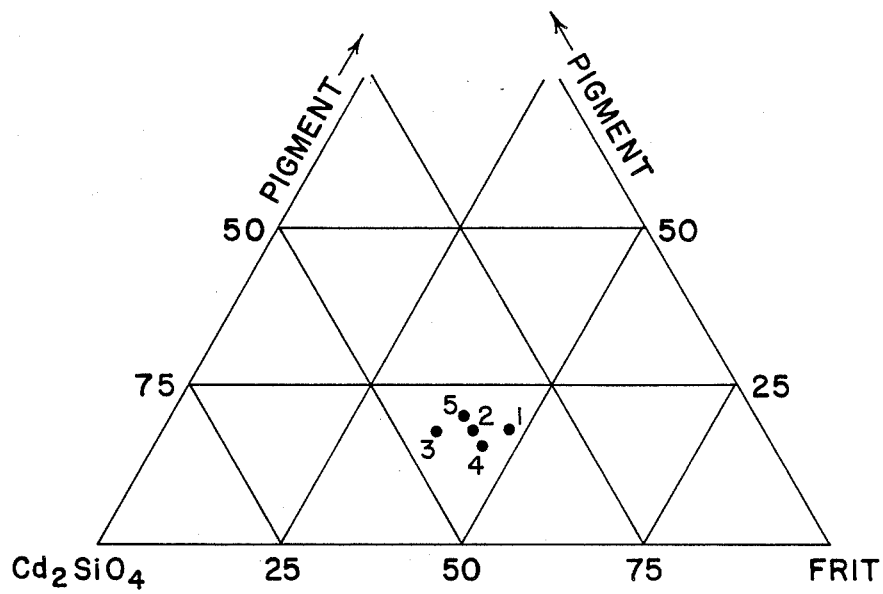

In FIG. 2, the inverted triangle encompassing samples 1-5 inclusive would represent the preferred region of frit:$Cd_2SiO_4$:pigment. That is, the frit in the system would range from 25 to 50 parts by weight; with the metal silicate from 25 to 50, and the pigment from 0 to 25 parts by weight, the three totalling 100 as they vary within their respective ranges.

FIG. 2 also serves to predict the useful, workable range of the metal orthosilicate in the fired, glass enamel.

Because of the short firing times of glass enamels (1 to 3 minutes) it is highly unlikely that any significant amount of $M_2SiO_4$, when added to the mill as depicted by FIG. 2, could go into solution in the host glass or frit. Therefore, the range of $Cd_2SiO_4$ encompassed by FIG. 2, i.e., 25 to 50 weight percent of the glass enamel system, would also be substantially the same workable range of $M_2SiO_4$ in the fired glass enamel, regardless of whether the $M_2SiO_4$ were crystallized out of glass solution during firing (Examples 1 and 2 above) or were present from the outset in the system itself, by being physically added thereto (FIG. 2).

Obviously, while this invention is concerned primarily with the temperature ranges wherein quarterlites would be bent or formed, it is well known that conventional glass enamels are generally fired at a range of from about 1000° to 1350° F. (approximately 538° C. to 733° C.). Thus, for any processing application analogous to the enameling of quarterlites, the instant invention could readily be applied at any temperature in that, with very little, routine experimentation, the amount of cadmium borosilicate glass, or pure cadmium or zinc orthosilicate crystals required in the system, could be determined in order to achieve a crystallizing amount of the precursors the silicate in the fired glass. That is, the amount of the precursors would vary only slightly, depending upon the degree of fusibility of the host glass. As previously indicated, the cadmium borosilicate frit depicted in Example 1 hereof, in combination with a conventional inorganic pigment and a small amount of refractory material to slightly lower coefficient of thermal expansion, functioned very well at a firing temperature of 1350° F.

Purely as a coincidence, it will be noted that the two host glasses disclosed herein, in Examples 2 and 3, contain a small amount of cadmium oxide; but, this is of no material significance to the practice of the instant invention. The small amount of cadmium oxide present in any conventional glass enamel frits, is there primarily to function as a stabilizer in the event the glass enamel frit is used in conjunction with a cadmium bearing red or yellow pigment. That is, a conventional glass enamel frit, if used with a cadmium pigment, may tend to react with it in such a way as to throw it toward an undesirable brownish tint. By incorporating a small amount of CdO in the glass enamel frit, it thereby becomes "satisfied", and tends not to disturb the cadmium in the cadmium pigment. At any rate, even if the small amount of the CdO contained in the conventional glass enamel frits were to somehow function as a precursor of later-recrystallized cadmium silicate, it would be of no material moment, since its effect, in whatever way, would be minimal, and readily compensated for by minor changes in the enamel system as might be indicated.

As stated above, inorganic pigments and/or opacifiers are routinely used with conventional glass enamels which are "designed" to accommodate them. Indeed, a completely clear glass enamel system, screened and fired onto a clear glass substrate, would serve absolutely no purpose.

Representative of, although in no way to be considered all-encompassing, the inorganic pigments or opacifiers useful in the practice of this invention, would be finely divided $TiO_2$ as an opacifier, and exemplary of the pigment used, indeed was in fact used for the instant application, would be a copper-chrome black oxide ($CuCr_2O_4$).

Worthy of note, is the fact that the present invention does not represent a selection of just any refractory material as an additive to a glass enamel, to make it refractory enough at firing temperatures of the glass matrix, such that it would not adhere to the Fiberfrax pad.

Discouraging results were repeatedly encountered in lengthy experimentation with substitute materials.

Exemplary of just a few of the blind alleys, would be compounds of barium, calcium, magnesium, as well as the obvious, refractory mineral fillers such as zirconia, alumina, etc.

Invariably, if enough of a known refractory mineral filler were incorporated to reduce the tackiness of the glass at firing temperatures, it so altered the fusion temperature of the resultant enamel, and possibly the coefficient of thermal expansion of the fired glass enamel (fit), vis-a-vis the glass substrate, as to be useless. Too, of all the refractory additives available for experimentation, none demonstrated the required firing range, i.e., 1000° F. to 1350° F., over which they could be made to function as contemplated by this invention. While a number of compounds showed some promise in alleviating tackiness at firing temperatures, without disturbing the "fit", they were found to adversely react with the necessary coloring pigments so as to render the ultimate, fired glass enamel unacceptable.

We claim:

1. A glass enamel system, the glass fraction of which is a lead borosilicate glass, wherein said system is adaptable to be fired and fused to a glass enamel on a glass substrate at from about 1000° F. to about 1350° F., comprising a crystallizing amount dispersed in said system of the precursors of the crystal $Cd_2SiO_4$ in sufficient quantities to provide from about 25 to about 50 weight percent $Cd_2SiO_4$ in the resulting, fired enamel.

2. The glass enamel system of claim 1 wherein essentially all the precursors of $Cd_2SiO_4$ are present in the form of crystalline $Cd_2SiO_4$.

3. The glass enamel system of claim 1 wherein the precursors of $Cd_2SiO_4$ are present as CdO and $SiO_2$, in solution in a cadmium borosilicate glass frit as a component of said glass enamel system.

4. The glass enamel system of claim 3 wherein said cadmium borosilicate frit has the general composition:

| OXIDE | Wt. % |
|---|---|
| CdO | 73 to 88 |
| $B_2O_3$ | 3 to 17 |
| $SiO_2$ | 3 to 21 | the foregoing components totalling 100 percent as they vary within their respective ranges.

5. The glass enamel system of claim 5, wherein the cadmium borosilicate frit has the following general composition:

| OXIDE | Wt. % |
|---|---|
| CdO | 75 to 85 |
| $B_2O_3$ | 5 to 15 |
| $SiO_2$ | 5 to 15. |

6. The glass enamel system of claim 1 adaptable to be fired at from about 1250° F. to about 1270° F.

* * * * *